Patented Feb. 4, 1947

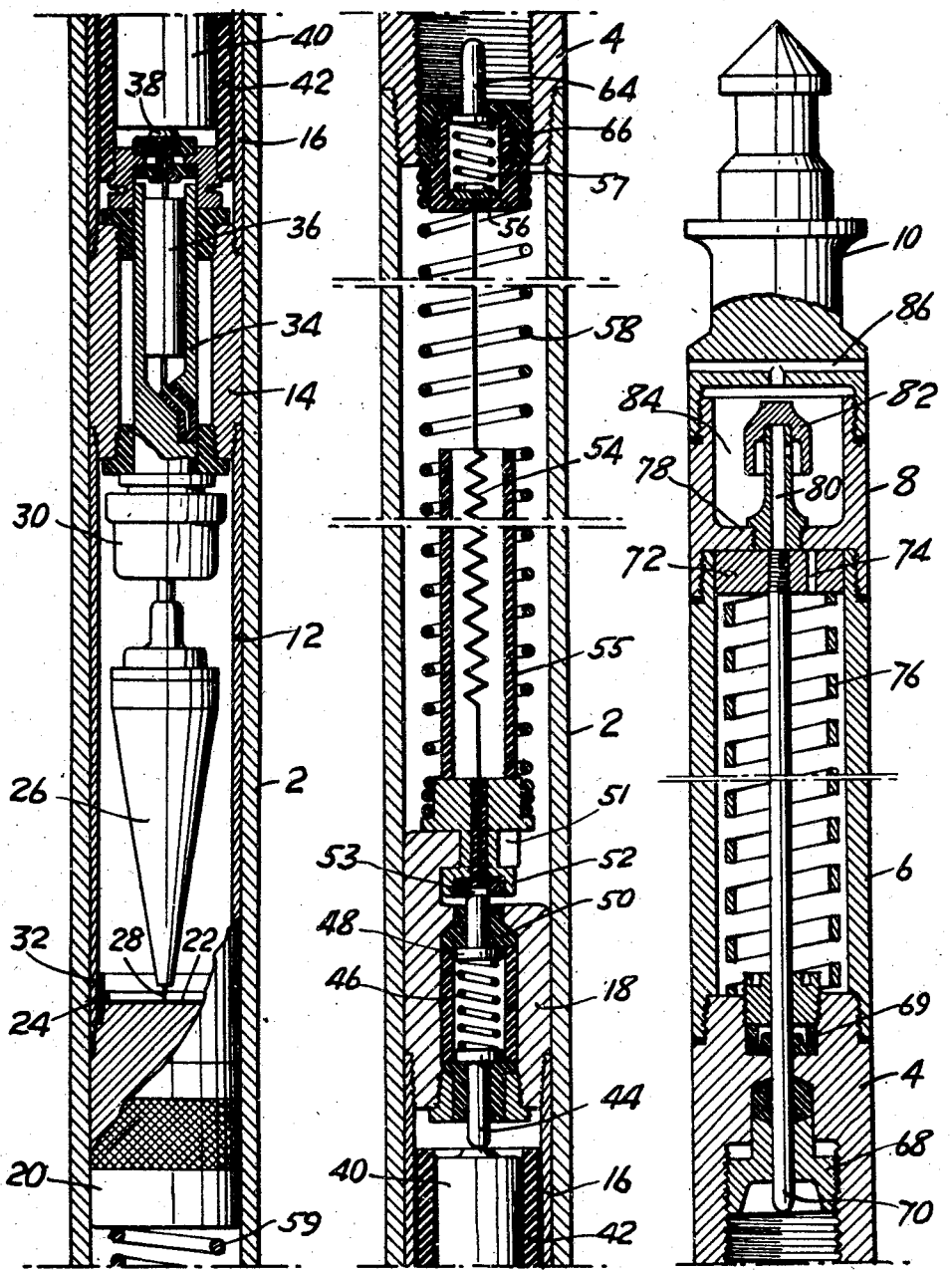

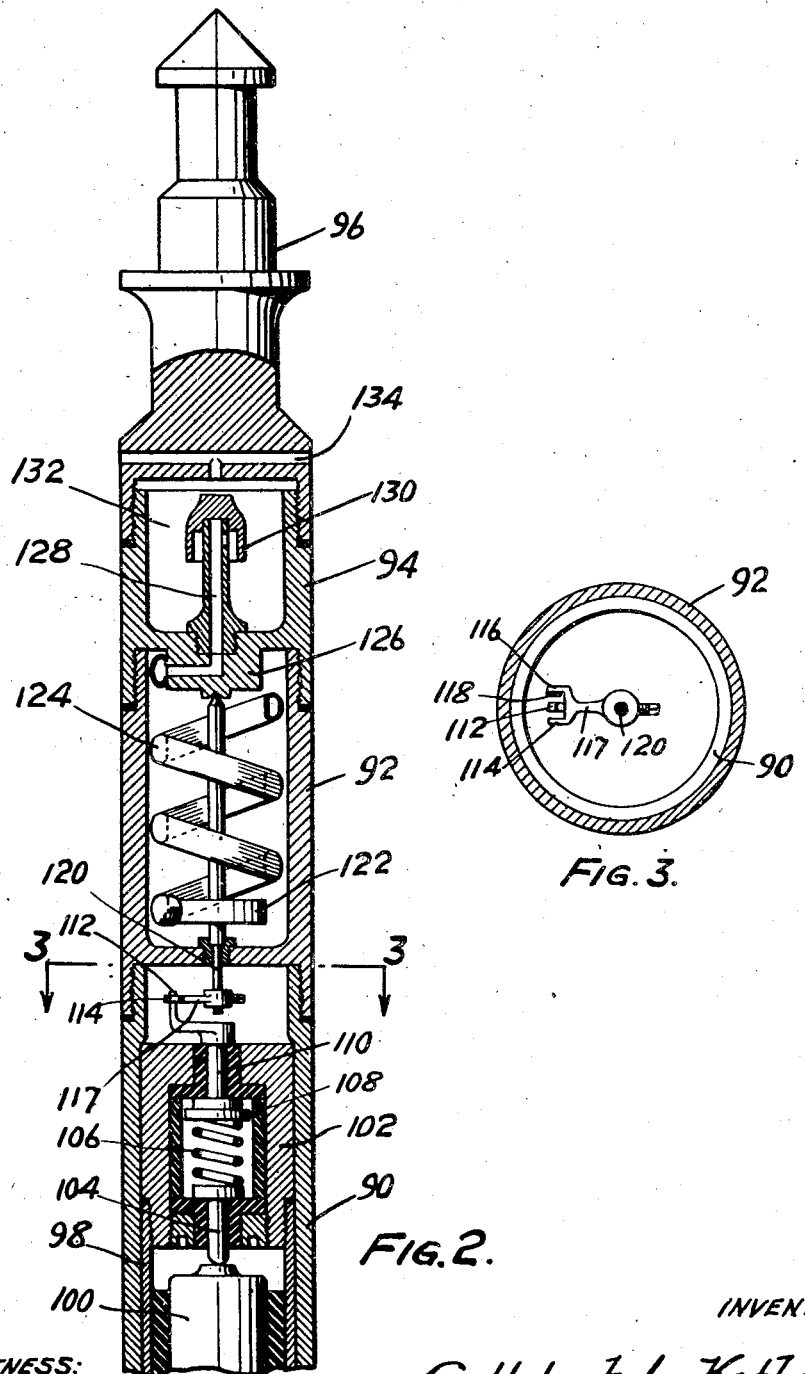

2,415,249

UNITED STATES PATENT OFFICE 2,415,249

WELL SURVEYING INSTRUMENT

Gottdank L. Kothny, Strafford, Pa., assignor to Sperry-Sun Well Surveying Company, Philadelphia, Pa., a corporation of Delaware Application July 28, 1943, Serial No. 496,441

14 Claims. (Cl. 33—205.5)

This invention relates to a well surveying instrument and has particular reference to the surveying of bore holes by the so-called go-devil method.

In the patent to Roland Ring 2,246,319, dated June 17, 1941, and in an application of said Roland Ring, Serial Number 379,835, filed February 20, 1941, there are described an instrument and methods of operating the same, which instrument is characterized by a slow and continuous recording action, specifically electrolytic in character, whereby a record of the position of the instrument within a bore hole is made only when the instrument remains stationary for an extended period of time. For a better understanding of the nature of the present invention, which is not, however, limited for its application to said instrument of the above-mentioned patent and application, the operation of said Ring instrument may be described as follows:

If the instrument is run into a bore hole either within a drill stem or in an open hole by means of a wire line or a cable, the movements of the instrument incidental to its descent into the hole cause a pendulum to move about relative to a record member so that even though current is continuously flowing from the pendulum to the record member, no point of the record member is exposed to the current action for a sufficiently long time to receive a definite marking. When the instrument reaches the level at which a record of inclination is to be made, it is brought to rest and held in such position for a period of upwards of about one minute with the result that the electrolytic action is concentrated at one point of the record member and an easily distinguishable spot is made thereon. If it is then desired to make one or more additional records at other levels, the instrument is moved to these successive levels and permitted to remain at them for definite periods of time with the result that marks differing in intensity and/or size are produced which, by their nature, can be identified with the particular levels through a knowledge of the relative times during which the instrument was stationary. Following the completion of the record or records, the instrument is then withdrawn continuously from the hole, and in this withdrawing movement, as well as in the periods of movement between the successive recordings, the pendulum will swing relative to the record member so that again no obliterating markings are produced.

In the case of operation of the above type, the instrument is perfectly satisfactory and requires no timing means whatever. However, a common practice in the making of records with other types of surveying instruments involves their being dropped freely through a drill stem so that they come to rest in a position adjacent the bit. During this location in a position of rest, a record is made under the control of suitable timing means, and the instrument is then recovered when the bit is brought to the surface, for example, for the purpose of changing the bit or checking its condition.

In the use of said Ring instrument in go-devil fashion, the motion of the instrument through the drill stem prevents the making of any records during its fall, and a record is then made by holding the drill stem stationary for a sufficient period of time while the instrument rests adjacent the bit. If the drill stem was then raised and dismantled by continuous work of the drilling crew, the instrument would be subject to sufficiently continuous agitation with only quite limited periods of rest so that no record-obliterating markings would be produced on the record member. However, it is not usual for a derrick crew to work continuously in removing a drill stem from deep holes and, generally speaking, even if some mechanical reason for delay does not occur, the workmen after raising the drill stem part way, will take a short period of rest before proceeding further. If an instrument of the Ring type is in the drill stem during such a period of rest or any other period of stationary condition of the drill stem, it will be obvious that another record will be made which might be indistinguishable from the desired record unless a substantially definite time of rest is involved; and even then in some rare instances, particularly where the hole is substantially vertical, the two records may overlap so that the significance of the original one is lost. It is generally undesirable to rotate the drill stem during such a period of interruption of its withdrawal and consequently such rotation is not a practical solution to the problem.

The present invention relates to the provision of means for terminating the recording action of a recording instrument of the Ring or other type at a desired time. Specifically, in accordance with the invention this is effected by controlling the current flow in accordance with the mud pressure encountered by the instrument in its location in the hole.

This, and other objects of the invention particularly relating to details, will become apparent from the following description read in conjunction with the accompanying drawings in which:

Figures 1A, 1B, and 1C represent longitudinal sectional views through lower, intermediate, and upper portions of one form of well surveying instrument embodying the invention;

Figure 2 is a longitudinal sectional view similar to Figures 1B and 1C but showing a modified arrangement for the upper portion of the instrument; and Figure 3 is a transverse section taken on the plane the trace of which is indicated at 3—3 in Figure 2.

Referring first to the modification of Figures 1A, 1B, and 1C, the instrument illustrated therein is basically of the type disclosed in said Ring application and comprises a protective casing capable of withstanding mud pressure which includes sections 2, 4, 6, and 8 and the closure 10 embodying a spearhead. An inner casing comprises the sections 12 and 16 joined by a coupling 14. The upper end of the section 16 is closed by the plug 18, while the lower end of the section 12 is closed by the plug 20 to which may be secured the record member 22 by means of a threaded ring 24, though the record member may be otherwise secured in the plug, for example by being depressed within a flanged portion thereof. This record member, as described in detail in said Ring patent and application, preferably comprises a sheet of paper containing a colored material such as a colored metallic ferrocyanide which, upon the passage of an electric current while it is moist, will be marked with a white or contrasting spot by reason of the formation of alkali at a cathode provided by a metallic point 28 slidable within a pendulum 26 mounted for universal pivotal movement in a bearing arrangement 30. An insulating ring 32 prevents a short circuit by preventing contact of the pendulum with the metallic wall of the tube 12.

The bearing 30 is carried by the lower end of a cylindrical pin 34 which extends through an opening in the coupling member 14 and is insulated therefrom as indicated in the drawing. Within the pin 34 there is located a resistor 36, the lower lead of which is soldered within an opening in the pin, while its upper lead is electrically connected to an insulated contact button 38 on which may rest the bottom of the lowermost of a group of batteries 40 arranged in series in flashlight fashion and held within an insulating tube 42. Contact with the positive pole of the uppermost battery is made by means of a metallic pin 44 urged downwardly by a spring 46 which, in turn, makes electrical contact with and urges upwardly a pin 48, the spring 46 and the pins 44 and 48 all being carried by, but insulated from, the top plug 18 of the instrument, the insulation being achieved by insulating washers and sleeves such as indicated at 50.

The plug 18 is provided with a T-shaped engaging end indicated at 51 with which there is adapted to interengage a member 52 provided with an insulated contact button 53 connected by means of a wire 54 to a metallic contact disk 56, the wire 54 being desirably in part helical to permit expansion and contraction, this portion being located within an insulated sleeve 55 to avoid contact with other metallic parts of the apparatus. The contact button 56 is mounted within an insulating assembly 66 and provides a seat for a spring 57 which urges upwardly a pin 64.

A spring 58 is secured at its lower end to the member 52 and at its upper end to the insulation assembly 66 thereby providing a resilient support for the member 52 so that the interior instrument is supported against shock between the spring 58 and a lower cushion spring 59. It will be evident that the element described provides a conductive connection between the positive pole of the uppermost battery and the pin 64, the connections being insulated from the casing.

Through a stuffing box 68 and other packing 69 there extends a pin 70 connected at its upper end to a piston 72 provided with an axially extending opening 74. A strong spring 76 normally urges this piston to its uppermost position, the spring being initially very substantially loaded as described hereafter.

Threaded into the bottom 78 of the chamber 84 in the casing section 8 is a post provided with a bore 80 communicating through one or more lateral openings with the interior of the cap-like member 82 forming a sand trap. An arrangement of openings 86 furnishes communication between the exterior of the casing and the chamber 84.

In the operation of this apparatus the parts are assembled as indicated in the figures, a moistened record disk 22 being located on the lower plug for engagement by the pin 28 of the pendulum 26. It will be evident that under these conditions, with the piston 72 at its uppermost position and, therefore, with the plunger 70 out of contact with the pin 64, the circuit of the batteries 40 is open so that no recording will occur. As the instrument passes downwardly through the mud in the bore hole, inside the drill stem, if it is being used in go-devil fashion, or supported by a wire line if lowered in that way, the circuit will remain open; no dependence being had in the operation of this modification upon the motion of the pendulum to prevent the making of a record during the initial part of the lowering operation.

Eventually the effective pressure on the assembly of the piston 72 and its plunger 70 will overcome the preloading of the spring 76 and will start the piston 72 moving downwardly ultimately to bring into contact the plunger 70 and the pin 64. When this condition is attained, the electrical circuit is closed, the positive pole of the uppermost battery being now grounded, and, consequently, the instrument is ready to make a record. Recording is prevented, however, by the continued movement of the pendulum until the instrument reaches its final position of rest, for example, adjacent the bit of the drill stem. It is now permitted to remain in such position for a sufficient period of time to make a record of inclination. If desired, the drill stem may then be lifted to bring the instrument to another level, or the wire line may be withdrawn if the instrument is attached thereto, to make a second record, the instrument remaining at rest for a period of time different from that during which the instrument was at rest for the making of the first record. This operation may be again repeated provided that the instrument remains at a sufficient depth so that the pressure of the mud maintains contact between the plunger 70 and pin 64.

In order to interrupt the record, it is then only necessary to lift the instrument to such height that the mud pressure existing there is insufficient to keep the piston and plunger assembly in a sufficiently lowered position to produce electrical contact with the pin 64. As soon as the instrument is above such level, recording ceases and if it has been kept in motion between recordings theretofore, it may remain at rest for an indefinite period without affecting the record or records previously made. As will be evident from the introductory matter of this description, this is of particular value when the instrument is used in go-devil fashion, since the crew may stop the dismantling of the drill stem for any desired period. Eventually, the instrument is withdrawn and may be opened for examination of the record.

It will be evident that the spring 76 used should be so chosen as to conform with the depth at which recording is to occur and the density of the mud in the hole. For example, with a single recording instrument there may be provided a number of springs or, more conveniently, a number of complete sets of the assembly comprising the sections 4, 6, and 8 of the protective casing and their contents, or various parts thereof. In this fashion, there may be provided springs 76 of different strengths and different degrees of preloading so that by suitable choice of a spring, the operator may insure that the piston 72 will begin to move downwardly only after a certain depth is reached and additionally insure that at the desired depth of recording the electrical circuit will be complete so that the recording may take place. Thereupon after withdrawing the instrument to a predetermined depth, the circuit will be interrupted to stop the recording operation. Instead of using various springs, a single spring 76 may be used subject to predetermined adjustment of its preloaded condition, for example, by supplying various lengths of tubes 6 with corresponding rods 70.

Figures 2 and 3 illustrate a modified form of device also pressure-controlled but involving a somewhat different mode of control. In this modification the protective casing involves the sections 90, 92, and 94, the last being capped by the spearhead 96. The surveying instrument within the protective casing is indicated at 98 and except for the detail of its top plug, this instrument is identically that described above to the extent that Figure 1A may be considered as showing the portion of the instrument below Figure 2, the uppermost of the batteries in this latter modification being indicated at 100. The top plug 102 of the instrument 98 contains a pin 104 pressed downwardly to engage the positive pole of the uppermost battery by a spring 106 which, in turn, bears upon a disk 108 engaging the head of a spindle 110 which carries an arm 112 having an upturned portion as illustrated. The various elements just mentioned are mounted in insulating inserts in the plug 102 so that there is no grounding through any of these elements of the positive pole of the uppermost battery.

The upturned end of the arm 112 projects between the arms 114 and 116 of a member 117 carried by an upright shaft 120. The arm 114 is adapted to be engaged by the arm 112 to provide a metallic electrical contact but the arm 116 is provided with an insulating pad 118 so that electrical contact between the arm 116 and the end of the lever 112 is prevented.

The shaft 120 has its axis extending along the axis of the instrument and carries a disk 122 to which there is secured the closed lower end of a helical tube 124 which takes the form and has the functions of the tube of a Bourdon gauge; i. e., when subjected to internal pressure, the free end of the helix will have imparted thereto a rotary motion arranged to turn the spindle 120 in such direction as to move the fork 114 of the lever 117 clockwise as viewed in Figure 3 to engage the arm 112.

The upper end of the helical tube 124 is secured to the portion 126 of the casing section 94. Its interior communicates through a passage 128 and the sand trap 130 with the chamber 132 which, in turn, communicates with the exterior of the instrument through passage 134.

In the use of this apparatus, the parts illustrated in Figure 2 are assembled with the parts illustrated in Figure 1A, a moistened record disk being in place beneath the pendulum. As the instrument drops through the drill stem, the pressure of the mud will cause a rotation of the shaft 120 to cause the arm 114 to engage the arm 112 with a resulting grounding of the positive pole of the battery 100 thereby completing the electrical circuit. Under these circumstances, however, recording is prevented by reason of the motion of the pendulum during the descent of the instrument. The spring 106 through the disk 108 imposes a quite substantial friction on the spindle 110 and, consequently, while the arm 112 will be rotated by engagement by the arm 114, there will be maintained uniform continuous contact. This is not important during the descending operation, but it is important to insure that when the instrument reaches the bottom there is electrical contact between 112 and 114. When the instrument reaches the bottom of the hole and comes to rest, the circuit will then remain completed and after the pendulum comes to rest, a record will be made by holding the instrument in fixed position for a predetermined length of time.

If the instrument is now withdrawn by removal of the drill stem, it must rise only through a relatively small distance before the relief of pressure in the tube 124 will cause the shaft 120 to rotate in a counter-clockwise direction as viewed in Figure 3, breaking contact between 112 and 114. As a result, even if removal of the drill stem is interrupted so that the pendulum may become stationary, the circuit is broken so that no further recording will take place. As the instrument is further withdrawn from the hole, the pressure will continue to decrease with the result that the insulating pad 118 will engage the arm 112 rotating the same back to its original position when the surface is reached. During all of this reverse rotation, however, it will be obvious that there will not be remade the circuit through the pendulum so that there can be no further recording despite cessation of movement.

As contrasted with the first modification which is adapted to operate at a definite depth range depending upon the nature of spring 76, the modification of Figures 2 and 3 is adapted for universal application at any depths within a very wide range. For example, the electrical circuit is made as soon as the instrument is lowered to a depth which will cause the arm 117 to move through an angle equal to the angle of clearance of the arm 112 between 114 and 118. From then on as the instrument is lowered, the electrical contact is maintained. As soon as the movement is reversed, i. e., the instrument is raised, the contact will be broken and during the raising operation, the contact will be maintained broken. It will thus be seen that all that is necessary to secure a record is to insure that immediately prior to the making of the record, the instrument is lowered through such distance that the increase in hydraulic head would insure contact. For example, if a plurality of records are to be made, the instrument may be first lowered to the first recording level. Then it may be raised above the next recording level a distance equal to the hydraulic head corresponding to the clearance referred to above and then lowered to this latter level with the assurance that contact will be remade for the second record. This procedure may then be repeated as often as desired, the records being distinguished from each other by maintenance of the instrument in stationary condition for definite periods of time.

Instead of using a Bourdon tube 124 for securing rotation of the contact elements, it will be evident that a piston may be used provided with a helical groove through which rotation may be imparted to an arm such as 117.

What is claimed is:

1. A well surveying instrument comprising means for supporting a record member, slowly acting means for recording inclination of the instrument on said record member, and fluid pressure responsive means for interrupting the recording action.

2. A well surveying instrument comprising means for supporting a record member, means for recording inclination of the instrument on said record member, and means responsive to liquid pressure about the instrument for interrupting the recording action.

3. A well surveying instrument comprising means for supporting a record member, means for recording inclination of the instrument on said record member, and means responsive to changes of liquid pressure about the instrument incidental to substantial vertical displacements thereof within a bore hole for interrupting the recording action.

4. A well surveying instrument comprising means for supporting a record member, means for recording inclination of the instrument on said record member, and means responsive to changes of liquid pressure about the instrument incidental to substantial vertical displacements thereof within a bore hole for controlling the recording action.

5. A well surveying instrument comprising means for supporting a record member, electrically operating means for recording inclination of the instrument on said record member, and means responsive to fluid pressure about the instrument for controlling the circuit of said electrically operating means.

6. A well surveying instrument comprising means for supporting a record member, electrically operating means for recording inclination of the instrument on said record member, and means responsive to fluid pressure about the instrument for controlling the circuit of said electrically operating means to interrupt the recording action.

7. A well surveying instrument comprising means for supporting a record member, means for recording inclination of the instrument on said record member, and fluid pressure responsive means acting upon substantial rise of said instrument within a bore hole following a lowering thereof to control the recording action.

8. A well surveying instrument comprising means for supporting a record member, means for recording inclination of the instrument on said record member, and fluid pressure responsive means for controlling the recording action, said pressure responsive means comprising a member movable under external pressure against a preloaded spring to effect the control in a predetermined depth range.

9. A well surveying instrument comprising means for supporting a record member, means for recording inclination of the instrument on said record member, and fluid pressure responsive means for controlling the recording action, said pressure responsive means comprising a piston movable under external pressure against a preloaded spring to effect the control in a predetermined depth range.

10. A well surveying instrument comprising means for supporting a record member, slowly acting means for recording inclination of the instrument on said record member, and means responsive to liquid pressure about the instrument for interrupting the recording action.

11. A well surveying instrument comprising means for supporting a record member, slowly acting means for recording inclination of the instrument on said record member, and means responsive to liquid pressure about the instrument for controlling the recording action.

12. A well surveying instrument comprising means for supporting a record member, slowly acting means for recording inclination of the instrument on said record member, and means responsive to changes of liquid pressure about the instrument incidental to substantial vertical displacements thereof within a bore hole for interrupting the recording action.

13. A well surveying instrument comprising means for supporting a record member, slowly acting means for recording inclination of the instrument on said record member, and means responsive to changes of liquid pressure about the instrument incidental to substantial vertical displacements thereof within a bore hole for controlling the recording action.

14. A well surveying instrument comprising means for supporting a record member, slowly acting means for recording inclination of the instrument on said record member, and fluid pressure responsive means for controlling the recording action.

GOTTDANK L. KOTHNY.

REFERENCES CITED

The following references are of record in the file of this patent:

UNITED STATES PATENTS

| Number | Name | Date |
| --- | --- | --- |
| 2,246,319 | Ring | June 17, 1941 |
| 2,316,612 | Kothny | May 11, 1943 |
| 1,963,090 | Jakosky | June 19, 1934 |
| 1,042,931 | Foote | Jan. 6, 1925 |
| 2,224,957 | Ernst | Jan. 17, 1940 |
| 1,900,229 | Dennis | Mar. 7, 1933 |
| 1,895,615 | Elliott | Jan. 31, 1933 |
| 2,318,612 | Kothny | May 11, 1943 |
| 1,542,931 | Foote | June 23, 1925 |
| 2,265,098 | Bettis | Dec. 2, 1941 |
| 2,096,803 | Hantjopoulas | Oct. 26, 1937 |